United States Patent [19]

Rueckert

[11] 4,437,133

[45] Mar. 13, 1984

[54] CURRENT SOURCE INVERTER COMMUTATION-SPIKE-VOLTAGE PROTECTION CIRCUIT INCLUDING OVER-CURRENT AND OVER-VOLTAGE PROTECTION

[75] Inventor: Barry J. Rueckert, New Berlin, Wis.

[73] Assignee: Eaton Corporation, Cleveland, Ohio

[21] Appl. No.: 381,265

[22] Filed: May 24, 1982

[51] Int. Cl.³ ............................................. H02H 7/09
[52] U.S. Cl. ........................................ 361/33; 361/56;
361/91; 361/111; 361/100; 363/50; 363/55;
363/58; 318/345 C; 318/329
[58] Field of Search ................. 361/100, 91, 111, 56,
361/31, 33, 54, 55, 23; 318/434, 762, 768, 782,
318, 329, 330, 333, 341, 342, 345 R, 345 C, 345
B, 345 D, 345 G, 345 H; 363/50, 55, 57, 58, 81,
37

[56] References Cited

U.S. PATENT DOCUMENTS

| | | | |
|---|---|---|---|
| 3,375,405 | 3/1968 | Fallon et al. | 361/56 |
| 3,408,551 | 10/1968 | Kuba | 363/40 |
| 3,536,984 | 10/1970 | Rosenberry, Jr. | 363/58 |
| 3,573,550 | 4/1971 | Baker, Jr. | 361/56 |
| 3,626,249 | 12/1971 | Snedeker | 361/56 |
| 3,793,535 | 2/1974 | Chowdhuri | 361/111 |
| 3,831,077 | 8/1974 | Richeson, Jr. | 363/50 X |
| 3,939,363 | 2/1976 | Engel | 361/111 |
| 3,980,930 | 9/1976 | Glogolja | 361/56 |
| 4,180,767 | 12/1979 | Risberg | 318/345 R |
| 4,183,081 | 1/1980 | Cutler et al. | 363/58 X |

*Primary Examiner*—Patrick R. Salce
*Attorney, Agent, or Firm*—C. H. Grace; W. A. Autio

[57] ABSTRACT

An adjustable-frequency three phase motor control system (2, CSI, M) is provided with a spike voltage clamp (SVC) to control the magnitude of voltage spikes generated during commutation of the current source inverter (CSI) thereby to protect the low voltage power devices (12a-c, 14a-c, SCR1-6) from damage. This spike voltage clamp comprises a rectifier bridge (32) connected to the output terminals (01, 02, 03) of the inverter (3) a storage capacitor (C) connected across the rectifier bridge output terminals, and a spike voltage dissipating resistor (Ra, Rb) and a gate turn-off thyristor (GTO) connected in series across the capacitor. A clamp control circuit (CC) precharges the storage capacitor and senses an increasing voltage thereon in response to voltage spikes across the motor terminals and gates the thyristor (GTO) to allow the resistor to dissipate a portion of the energy of the voltage spikes thereby limiting the magnitude of the voltage spikes. This clamp control circuit (CC) additionally includes an over-current sense circuit (OCS) that provides a fault trip signal if the resistor clamp is not turned off at the end of a required interval, and an over-voltage sense circuit (OVS) that responds to a higher spike voltage to provide a trip signal. This over-voltage trip signal and the over-current trip signal are fed to a common fault trip circuit (FT) which provides a gating signal to a fault thyristor (FSCR) thereby to provide an output signal which may be used to safely stop the motor control system. Whenever the spike voltage decreases below the voltage on the storage capacitor (C), the capacitor voltage blocks the three phase full-wave rectifier bridge (32) to decouple the resistor clamp circuit from the motor. When the voltage on the storage capacitor decreases to a required value, the clamp control circuit senses the decreasing voltage and gates thyristor GTO off to cause the resistor to be disconnected from the circuit.

7 Claims, 5 Drawing Figures

CURRENT SOURCE INVERTER COMMUTATION-SPIKE-VOLTAGE PROTECTION CIRCUIT INCLUDING OVER-CURRENT AND OVER-VOLTAGE PROTECTION

BACKGROUND OF THE INVENTION

A number of approaches to control the magnitude of voltage spikes generated during commutation of a current source inverter have been known heretofore.

One means for doing this has been with the use of a resistor-capacitor clamp. While this technique might be comparable in size and cost to the resistor clamp hereinafter described, it has the disadvantage that its reliability is poor because a very large number of electrolytic capacitors are required to effectively snub voltage transients. Electrolytic capacitors are unreliable in applications where they require continuous charging and discharging. In addition, this type of device is always connected to the drive output and continuously dissipates power which results in a degradation of overall system efficiency and performance.

Another means for doing this has been by use of a line commutated inverter. While this technique may have similar performance as compared to the resistor clamp hereinafter described, and has the added advantage of being non-dissipative, it has the disadvantage in that it requires a substantially larger number of parts and controls with consequent increase in size and cost.

A third approach in solving this problem has been by the use of power zener diodes. While this approach is comparable in performance and size to the resistor clamp hereinafter described, and its reliability is excellent since it has no controlled elements as does the resistor clamp, nevertheless it has the disadvantage that a power zener diode clamp is very expensive.

Still another approach that has been used is what might be called reduced drive performance in which the current source inverter would have no voltage clamp at all or a minimal voltage clamp. While this approach has good reliability as well as minimal size and cost, it nevertheless has the disadvantage that it cannot achieve large dynamic responses nor can it tolerate overload conditions. Therefore, system performance of this type of drive is severely limited.

SUMMARY OF THE INVENTION

An object of the invention is to provide an improved current source inverter commutation-spike-voltage clamp circuit for a motor control system.

A more specific object of the invention is to provide a motor control system having a current source inverter with improved commutation-spike-voltage clamp circuit means that incorporates over-current protection.

Another specific object of the invention is to provide a motor control system having a current source inverter with improved commutation-spike-voltage clamp means that incorporates over-voltage protection.

Another specific object of the invention is to provide a motor control system having a current source inverter with improved commutation-spike-voltage clamp circuit means that incorporates over-current and over-voltage protection.

Other objects and advantages of the invention will hereinafter appear.

DESCRIPTION OF THE PREFERRED EMBODIMENT

Figure 1:
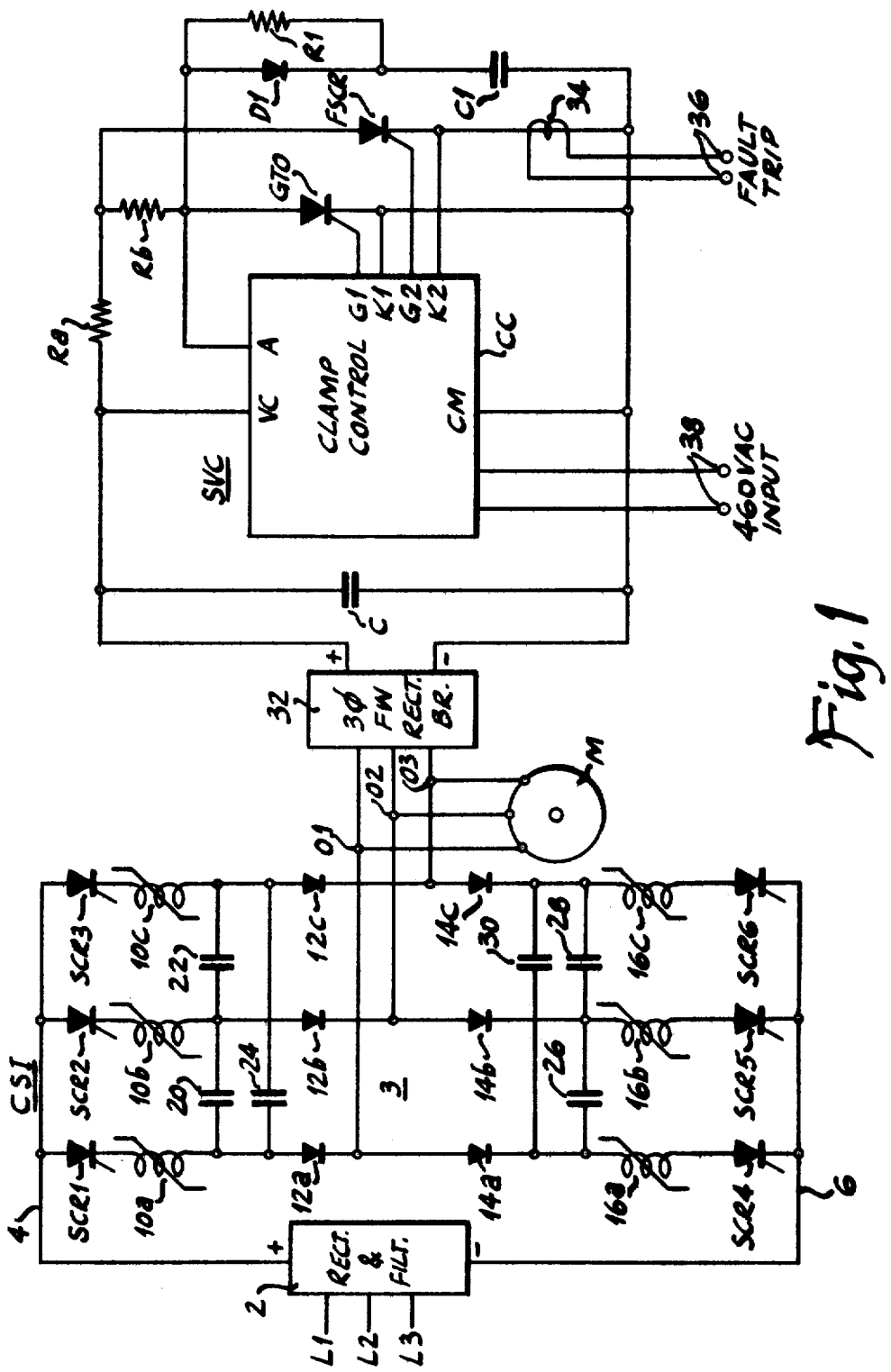
FIG. 1 is a partially schematic and partially diagrammatic illustration of a motor control system having a current source inverter and including the commutation-spike-voltage clamp circuit and clamp control circuit with over-current and over-voltage protection in accordance with the invention.

FIG. 1 shows an AC motor control system supplied from a three phase input line L1, L2 and L3 for operating a three-phase motor M. For this purpose, the three-phase input line is connected through a current source inverter CSI including a three-phase controlled rectifier and filter 2 and an inverter 3 to motor M. Inverter 3 is a conventional type adapted for converting the DC current at the output of rectifier and filter 2 into an adjustable frequency three-phase current for controlling the speed of motor M. As shown in FIG. 1, this inverter has three low voltage power device branches between positive conductor 4 and negative conductor 6. The first branch has a controllable thyristor SCR1 such as a silicon controlled rectifier (SCR) and an inductor 10a and a unidirectional diode 12a and then another unidirectional diode 14a and inductor 16a and a controllable thyristor SCR4 such as an SCR connected between lines 4 and 6 with the junction between diodes 12a and 14a connected to output terminal O1. The other two branches of this inverter have similar elements as shown in FIG. 1 and the junctions between their diodes 12b, 12c and 14b, 14c are connected to output terminals 02 and 03, respectively. Also, capacitors 20, 22 and 24 are connected from the points between first inductors 10a–c and first diodes 12a–c of the respective branches to similar points in the other respective branches. Likewise capacitors 26, 28 and 30 are connected from the poins between second diodes 14a–c and second inductors 16a–c of the respective branches to similar points in the other respective branches. Since this inverter is of conventional type, the gate firing circuits for SCR1 and SCR4 in the first branch and SCR2, SCR5, SCR3 and SCR6 in the other two branches has not been shown to avoid complicating the drawing. In actual practice, such firing circuit would fire the six SCR's in a sequence such that the DC voltage appearing across lines 4 and 6 would be converted to a three-phase AC voltage for application to motor M.

More specifically, the six SCR's switch the DC current into the motor phases at the rate set by the inverter frequency control. The six commutating capacitors provide a means for storing the energy required for commutation of the SCR's. The six diodes isolate the commutating capacitors from the load, that is, the motor. The six reactors are used to limit the rate at which the current can change during SCR switching. The magnitude of the current flowing in the inverter power bridge is controlled by rectifier power bridge 2. The current flowing in the inverter will always be in the same direction as in rectifier 2. The inverter bridge only controls how long current is applied to a particular motor phase. It will, therefore, be seen that since rectifier 2 controls the magnitude of the motor current and inverter 3 controls the frequency of such current, the speed of the motor may be controlled.

In the inverter, commutation of an SCR is accomplished by firing the next sequential SCR in connection with the polarity of the voltage stored on the commutating capacitors. The voltage stored is related to the amount of current flowing, the value of commutating capacitance and the inductance of the motor. Whenever an SCR is fired, a ringing voltage results at the resonant frequency of the motor inductance and commutating capacitance. The energy transferred during this ringing causes a large voltage transient to be impressed on the motor. To keep this transient voltage to a controlled level, a spike voltage clamp SVC is used. This spike voltage clamp is shown at the right hand portion of FIG. 1 connected to inverter output terminals 01, 02 and 03 and will be hereinafter described in more detail.

Generally speaking, three phase full-wave bridge 32 which is connected to inverter output terminals 01, 02 and 03 is used so that only one clamp resistor R and only one gate-turn-off thyristor GTO is required for the motor control system. The capacitor C is used with bridge 32 as a means to decouple the clamping circuit from the current source inverter output terminals when the clamping function is not required. Resistor R$a$–$b$ dissipates excess commutation energy when required. Thyristor GTO is a gate-turn-off thyristor that is turned on to connect resistor R$a$–$b$ through bridge 32 to the motor terminals when required and turned off when resistor R$a$–$b$ has dissipated the voltage spike. The snubber circuit consisting of diode D1, capacitor C1 and resistor R1 is a standard polarized snubber circuit that will enhance the proper turn-on and turn-off of thyristor GTO. The gating signals are generated by clamp control circuit CC to turn thyristor GTO on and off depending upon the magnitude of the voltage spike as hereinafter more fully described.

Fault thyristor FSCR which is preferably a silicon controlled rectifier is turned on to provide a resistor Ra clamp as well as a fault trip signal through coil 34 to fault trip terminals 36 in the event of an over-current or over-voltage condition as hereinafter more fully described. Clamp control circuit CC receives a 460 volt AC input voltage at terminals 38. This clamp control circuit also receives at its terminal VC the voltage on capacitor C. Also, this clamp control circuit senses at its terminal A the anode voltage of thyristor GTO for purposes hereinafter described. The common conductor is connected to terminal CM of clamp control circuit CC. Also, this clamp control circuit provides a 600 volt DC voltage at terminal VC for precharging capacitor C. At output terminals G1 and K1, this clamp control circuit provides a control pulse to thyristor GTO. And at output terminals G2 and K2, this clamp control circuit provides a control pulse for fault thyristor FSCR, all in the manner hereinafter more fully described in connection with FIGS. 2 and 3.

The circuit of FIG. 1 operates generally as follows. When the line to line motor voltage on any combination of motor line phases exceeds the voltage stored on capacitor C, the appropriate diodes in the fullwave bridge 32 will conduct and begin to charge capacitor C to a higher voltage. Also during this time, capacitor C1 will charge through diode D1 and resistors Ra and R1. When the voltage on capacitor C reaches a predetermined value, a signal will be generated by the clamp control circuit to turn on thyristor GTO and thereby effectively connect resistors R$a$–$b$ across the motor terminals through the full-wave bridge 32. Commutation energy will now be dissipated in resistors R$a$–$b$. When the line to line motor voltage falls below the voltage on capacitor C, full-wave bridge 32 will become reverse-biased and decouple capacitor C, resistors R$a$–$b$ and thyristor GTO from the motor terminals.

During the time that thyristor GTO is conducting, capacitor C1 will discharge through resistor R1 and diode D1 will be reversed-biased. With the circuit decoupled from the motor terminals, resistors R$a$–$b$ will continue to discharge capacitor C through thyristor GTO. When the voltage on capacitor C discharges to a predetermined level, a signal will be generated in the clamp control circuit to turn off thyristor GTO. When the turn-off signal is applied to thyristor GTO, the current flowing in thyristor GTO will transfer rapidly to uncharged capacitor C1 through diode D1. Capacitor C1 will charge until the voltage across capacitor C1 is equal to the voltage across capacitor C at which time diode D1 stops conducting. The circuit is now ready to clamp the next spike voltage.

Figure 2:
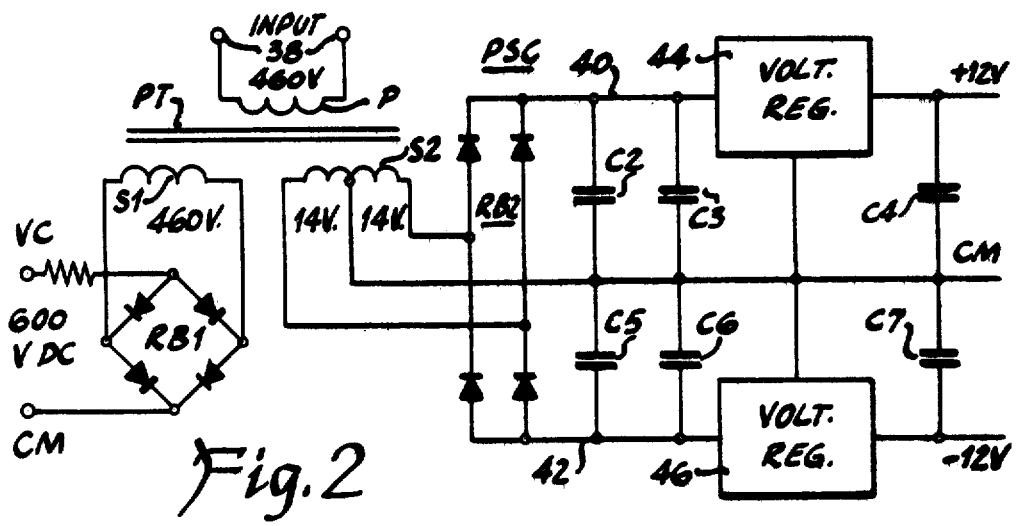
FIG. 2 is a circuit diagram of a power supply circuit incorporated in the clamp control circuit of FIG. 1.

Referring to FIG. 2 there is shown a power supply circuit PSC for and included in the clamp control circuit CC of FIG. 1. As shown therein, a 460 volt AC source is connected at terminals 38 across the primary winding P of a power transformer PT which has two secondary windings S1 and S2. Secondary winding S1 is connected through a single-phase full-wave rectifier bridge RB1 to supply 600 volts DC to terminals VC and CM which are connected across capacitor C as shown in FIG. 1 thereby to supply 600 volts DC for precharging capacitor C to that voltage level.

Secondary winding S2 supplies low voltage DC power for the logic circuits in FIGS. 3$a$–$c$. For this purpose, secondary winding S2 is connected at its midpoint to common CM and is connected at its opposite ends to the input terminals of a single-phase full-wave rectifier bridge RB2, the output terminals of which are connected to positive and negative voltage conductors 40 and 42, respectively. Positive and negative conductors 40 and 42 are connected through voltage regulators 44 and 46 to positive 12 volt and negative 12 volt output terminals, respectively, with the third terminal of these voltage regulators being connected to common conductor CM. A pair of capacitors C2 and C3 are connected between conductor 40 and common conductor CM at the input side of voltage regulator 44 and a capacitor C4 is connected between the plus 12 volt output conductor and common conductor CM at the output of voltage regulator 44. In a similar manner, capacitors C5 and C6 are connected between conductor 42 and common conductor CM at the input side of voltage regulator 46 and capacitor C7 is connected between the minus 12 volt output conductor and common conductor CM at the output side of voltage regulator 46. Therefore, this power supply is capable of supplying both plus 12 volts and minus 12 volts with reference to common, as needed, to the logic circuits of FIGS. 3$a$–$c$.

Referring to FIGS. 3$a$–$c$, which may be assembled by placing FIG. 3$b$ below FIG. 3$a$ and placing FIG. 3$c$ on the right-hand side of FIG. 3$b$, it will be seen at the upper left-hand portion of FIG. 3$b$ that the capacitor C voltage VC is applied across a voltage divider including series resistors R2–R3 to common, this voltage VC being the voltage across capacitor C in FIG. 1. The voltage at the junction between resistors R2 and R3 is applied through another voltage divider including series resistors R4–R5 to common so as to reduce the input voltage to a proper level compatible with the logic circuitry. For example, this voltage divider arrangement may be such that the voltage at junction 48 between resistors R4 and R5 will be one volt for 200 volts input on terminal VC. From this, it will be seen that the voltage at this point will be 5 volts for a 1000 volt input or 6.5 volts for a 1300 volt input, etc., which values will be referred to later on in this description. The voltage at junction 48 is applied through input resistor R6 to inverting input 3 of comparator CMP1, this comparator being of the LM311 type or the like. A precision 5 volt reference device 50 of the REF-02 Hz type or the like is used to apply a 5 volt reference voltage through resistor R7 to noninverting input 2 of comparator CMP1 and also through resistors R7 and R8 in series and diode D2 to output terminal 7 of the comparator which is connected through resistor R9 to plus 12 volts DC.

From the foregoing, it will be apparent that whenever voltage VC, which is the voltage on capacitor C in FIG. 1, rises above 1000 volts, the voltage on input 3 of comparator CMP1 will rise above 5 volts causing the output voltage at terminal 7 of the comparator to switch from high to low as indicated graphically by the pulse adjacent thereto. Whenever capacitor voltage VC drops back down to 900 volts, output 7 of comparator CMP1 will switch from low to high as indicated graphically by the pulse adjacent thereto. This difference as to the value of input voltage at which the output voltage of comparator CMP1 goes low or high is provided for by the voltage divider circuit resistors R7 and R8 and diode D2 which is effective when the output of comparator CMP1 is low to reduce the reference voltage on input 2 of the comparator but is not effective because it is blocked by diode D2 when the output of comparator CMP1 is high.

Figure 3C:
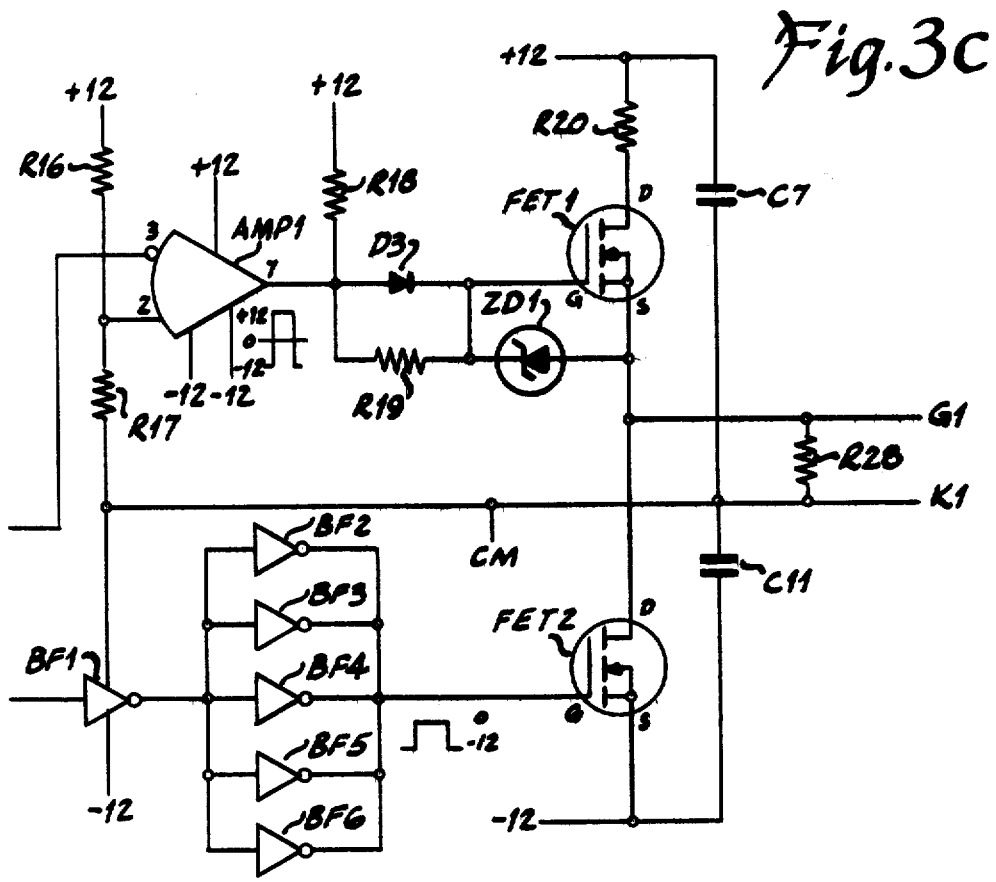
FIGS. 3a–c is a circuit diagram of the clamp control circuit of FIG. 1 and including over-current and over-voltage protective control.
Figure 3A:
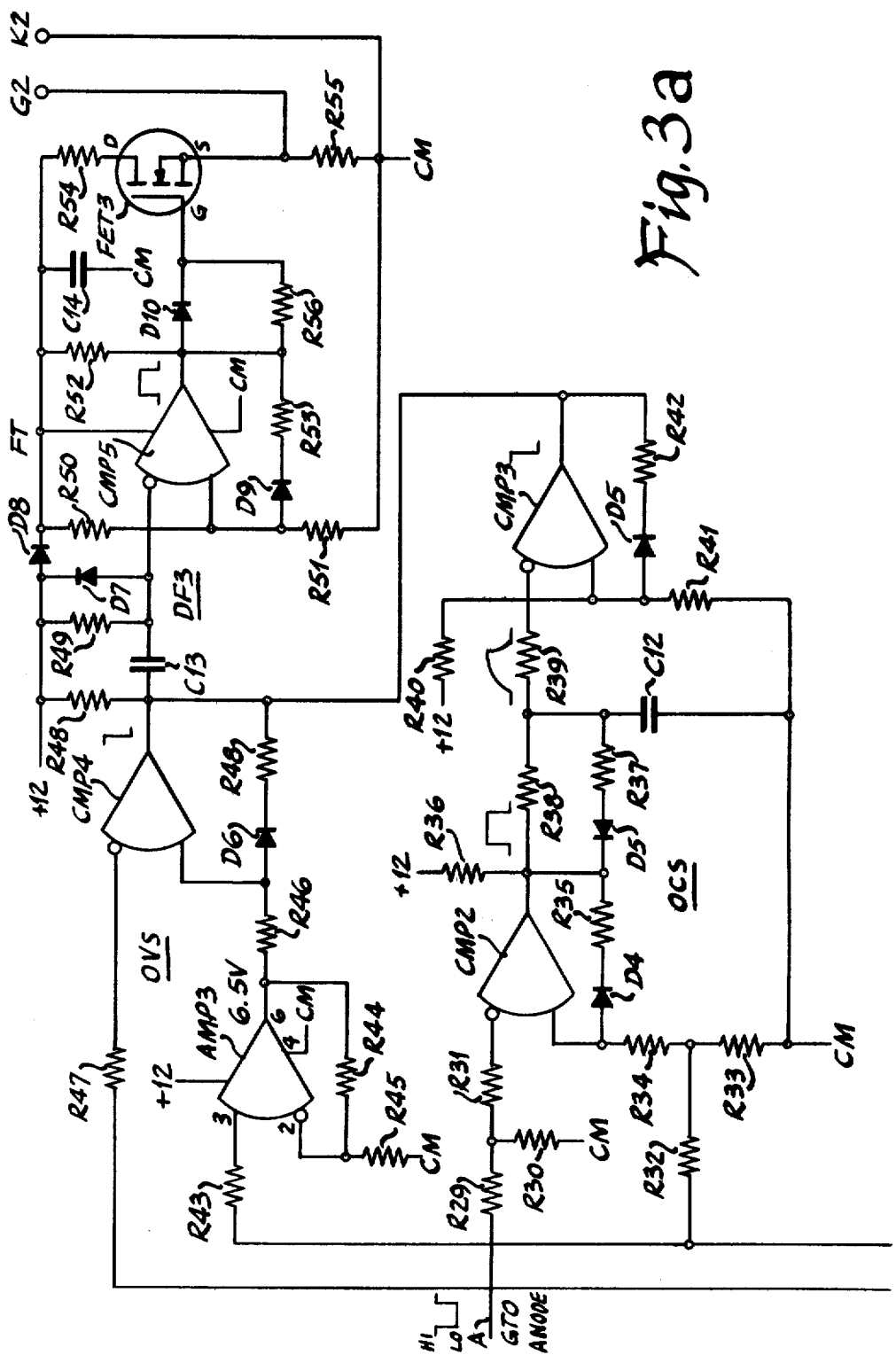
Figure 3B:
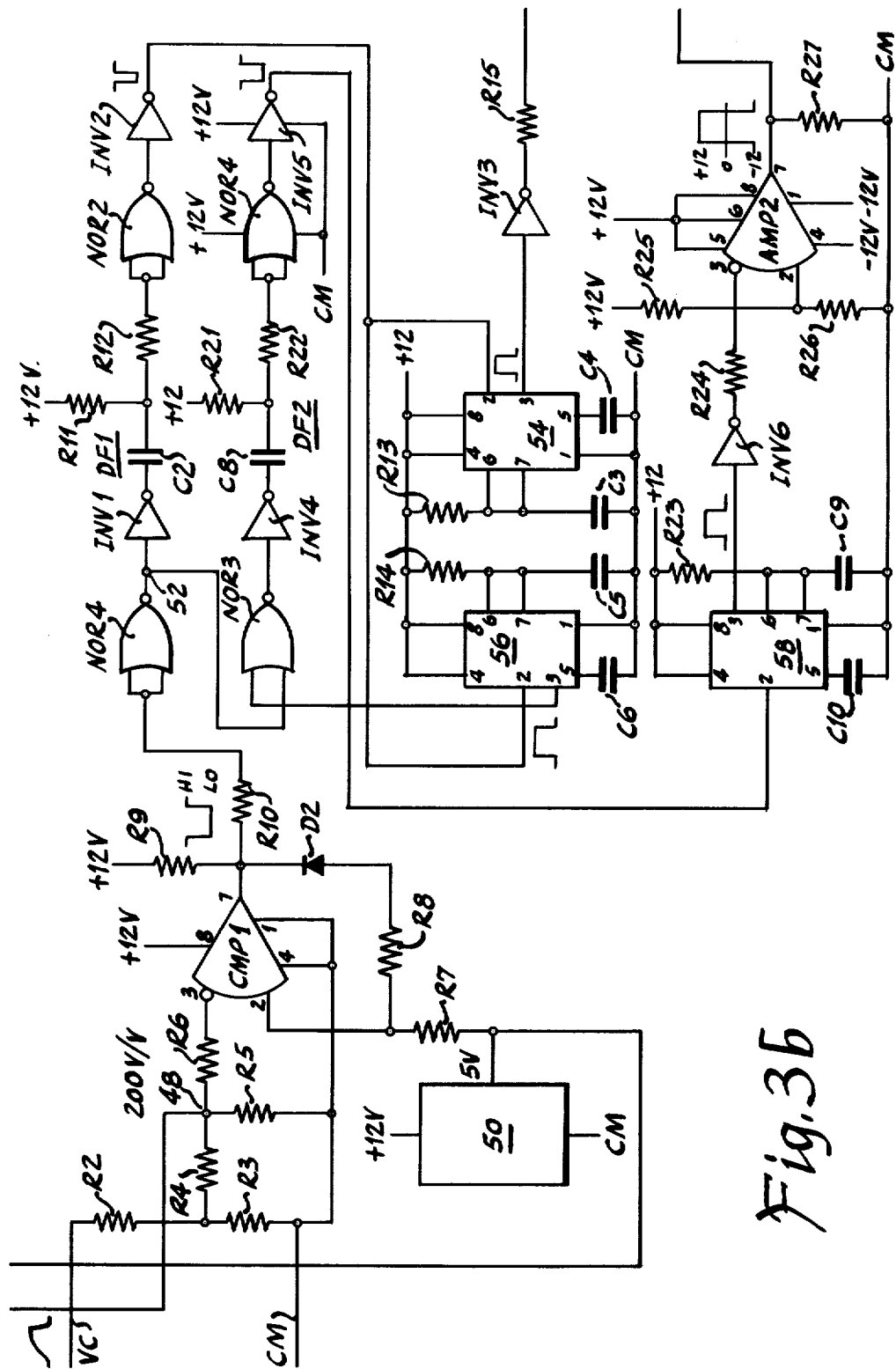

When the capacitor voltage VC rises to 1000 volts or above, a turn-on pulse is generated by the circuit in FIGS. 3b–c and applied from gating terminals G1 and K1 at the right-hand portion of FIG. 3c to gate thyristor GTO on in FIG. 1. For this purpose, the output of comparator CMP1 in FIG. 3b switches from high to low in the manner hereinbefore described. This pulse is applied through resistor R10 and pulse-shaping NOR logic NOR1 to junction 52. This NOR logic squares the edge of this high-to-low pulse so that it will operate the following circuit properly. This NOR logic also inverts the pulse which then appears at junction 52 so that it has to be inverted again in inverter logic INV1 to obtain a high-to-low pulse for operation of differentiating circuit DF1 which provides a negative pulse. This negative pulse is squared in NOR logic NOR2 which also inverts this pulse and which is then inverted in inverter logic INV2 to provide a negative pulse as indicated adjacent thereto for operation of timers 54 and 56. These timers are alike and may be of the 555 timer type or the like except that their time periods differ and are set by the values of their external resistors R13 and R14 and capacitors C3 and C5 as will hereinafter appear. Timer 54 provides a 20 microsecond positive pulse or the like at its output terminal 3 as indicated adjacent thereto which is long enough to insure turn-on of thyristor GTO. This positive pulse is inverted in inverting logic INV3 to a negative pulse and is then applied through input resistor R15 to inverting input 3 of amplifier AMP1, this amplifier being of the LM311 type or the like. Noninverting input 2 of the amplifier is biased positive 6 volts or the like by voltage divider series resistors R16–R17 connected to the 12 volt DC supply. Prior to receipt of the negative input pulse, inverting input 3 of amplifier AMP1 is held at plus 12 volts so that the output of the amplifier is held at minus 12 volts as indicated by the pulse adjacent thereto. Upon receipt of the negative pulse, inverting input 3 drops below the 6 volt bias so that the output of the amplifier which is connected through resistor R18 to plus 12 volts provides a plus 12 volts pulse as indicated adjacent thereto. This pulse is applied through reverse current blocking diode D3 to the gate of field effect transistor FET1 to turn it on. Resistor R19, zener diode ZD1 and blocking diode D3 form a protective circuit for transistor FET1. Upon being turned on, field effect transistor FET1 applies positive voltage and current through resistor R20 and terminal G1 to the gate of thyristor GTO in FIG. 1 to turn it on whereafter it remains conducting until it is turned off as hereinafter described. Capacitor C7 supplies turn-on current for thyristor GTO. Resistor R28 provides gate-cathode impedence for thyristor GTO.

It will be recalled from the foregoing description that a spike voltage caused by commutation in inverter 3 caused the voltage of capacitor C to rise from its precharged value of 600 volts DC to 1000 volts DC or above. As a result, thyristor GTO was gated on to cause current flow through resistor R. This resistor dissipates a portion of the commutation energy thereby limiting the magnitude of the spike voltage. This occurs as current flows from the inverter through three phase full-wave rectifier bridge 32, resistors Ra–b and thyristor GTO. When the voltage on capacitor C falls to a predetermined level, thyristor GTO is turned off in the manner hereinafter described to disconnect resistors Ra–b from the motor terminals. When the motor terminal voltage falls below voltage VC, the voltage on capacitor C blocks three phase full-wave rectifier bridge 32 and thereby decouples itself and the resistor clamp circuit from the motor terminals.

From the foregoing description, it will be recalled that when timer 54 was tripped on to provide a turn-on pulse for transistor FET1, timer 56 in FIG. 3b was simultaneously tripped on. External resistor R14 and external capacitor C5 have been given such values as to cause timer 56 to provide at its output terminal 3 a 50 microsecond positive pulse or the like as indicated adjacent thereto which is applied through NOR gate NOR3 and inverter INV4 to hold the input to differentiating circuit DF2 high. Since this differentiating circuit requires a high-to-low transition pulse for its operation, this timer 56 pulse inhibits the generation of a turn-off pulse for thyristor GTO for the duration of 50 microseconds. This inhibiting action prevents concurrent turn-on and turn-off pulses and provides a minimum on time for thyristor GTO after which it may be turned off provided comparator CMP1 provides the correct output pulse therefor.

Let it now be assumed that capacitor C voltage VC has dropped to a predetermined value such as 900 volts thereby causing the output of comparator CMP1 to switch from low to high as indicated adjacent thereto. This pulse is squared in NOR gates NOR1 and NOR3 and inverted in inverter logic INV4 to provide the correct high-to-low transition pulse for operation of differentiating circuit DF2. As a result, this differentiating circuit provides a negative pulse which is squared in NOR gate NOR4 and inverted in inverter logic INV5 to trip timer 58 into operation. External resistor R23 and external capacitor C9 of this timer are given values such that its output terminal 3 provides a 50 microsecond pulse as indicated adjacent thereto for turn-off purposes, this pulse being longer than the turn-on pulse to insure turn-off of thyristor GTO. This pulse is inverted in inverter logic INV6 and then applied through input resistor R24 to the inverting input 3 of amplifier AMP2 which may be of the LM311 type or the like. Noninverting input 2 of amplifier AMP2 is biased to an intermediate voltage of 6 volts or the like by voltage divider series resistors R25 and R26 connected to the plus 12 volt DC supply. It will be apparent that timer 58 acting through inverter INV6 normally holds inverting input 3 of amplifier AMP2 high so that the output of amplifier AMP2 is held low. As a result, gate G of field effect transistor FET2 in FIG. 3c is held at minus 12 volts DC as indicated adjacent thereto to keep this transistor turned off. Now when the timer pulse is applied, it causes inverting input 3 of amplifier AMP2 to go low, below the level of noninverting input 2, so that amplifier AMP2 provides a positive output pulse as indicated adjacent thereto. This amplifier output pulse is applied through inverting type buffers BF1-6 to provide a positive pulse, minus 12 volts to zero, to be applied to the gate of transistor FET2. While the power supply connection is shown only for buffer BF1 in FIG. 3c, all six of these buffers BF1-6 are similarly supplied on the same IC chip from minus 12 volts to common. In response to the aforementioned gate pulse, transistor FET2 is turned on thereby to cause a negative pulse to be applied through terminals G1 and K1 to the gate of thyristor GTO in FIG. 1 to gate this thyristor off. During this time, when turn-off transistor FET 2 is gated on, amplifier AMP1 holds the gate of turn-on transistor FET1 at minus 12 volts to keep it turned off. Capacitor C11 supplies gate-cathode voltage for turn-off of thyristor GTO.

To summarize, whenever the commutation in inverter 3 generates a voltage spike such as to cause the voltage of capacitor C to rise to 1000 volts or above, thyristor GTO is turned on thereby allowing resistor Ra-b to dissipate the energy and reduce the voltage spike. When the voltage on capacitor C falls to a lower predetermined value such as 900 volts, thyristor GTO is turned off. The purpose of this, of course, is to protect the SCR's and diodes in the inverter from being damaged by high voltage spikes.

There are two modes of possible failure that have to be protected against:

One is the failure of thyristor GTO to turn off after it has been turned on and the commutation energy has been dissipated to a level where thyristor GTO should turn off. Such failure of thyristor GTO to turn off indicates a probable fault in the clamp system requiring an expeditious shutdown of the drive system to correct the fault. Also, the resultant continuous current flow when thyristor GTO fails to turn off might damage the system. In connection with this, it has been determined that under all possible known conditions of operation, thyristor GTO does not have to remain turned on for longer than 800 microseconds at a time to dissipate the excess commutation energy. As a safety factor, a length of time 1.5 times this, or 1.2 milliseconds, has been chosen as the maximum allowable on-time of thyristor GTO. If this thyristor does not turn off after 1.2 milliseconds, an over-current sense circuit will generate a fault trip signal which may be used to disconnect power from the motor control system or for other protective purposes as hereinafter more fully described.

The other mode of possible failure is the failure of thyristor GTO to turn on when required which would indicate a possible fault in the clamp system requiring an expeditious shutdown of the drive system to correct such fault. Also, the resultant continuation of voltage increase when thyristor GTO fails to turn on could damage the system. Normally, thyristor GTO is set to turn on when the voltage on capacitor C rises to a predetermined level such as 1000 volts. If this voltage should rise to a predetermined higher value, such as 1300 volts, which may be set at any desired higher value, that would indicate that thyristor GTO has failed to turn on due to a probable fault in the clamp system requiring an expeditious shutdown of the drive system to correct the fault. If this happens, an over-voltage sense circuit will generate a fault trip signal which may be used to disconnect power from the motor control system or for other protective purposes as hereinafter more fully described.

The circuit at the lower portion of FIG. 3a is an over-current sense circuit OCS which operates if the thyristor GTO current flows for more than 1.2 milliseconds at a time to phase back the power input, trip a circuit breaker, or the like, by gating fault thyristor FSCR in FIG. 1. The circuit at the upper left-hand portion of FIG. 3a is an over-voltage sense circuit that operates in the event the voltage on capacitor C in FIG. 1 rises to a predetermined higher value of voltage than the 1000 volts previously referred to, for example, a value of 1300 volts, and gates fault thyristor FSCR on. As shown in FIG. 3a, both the over-current sense circuit OCS and the over-voltage sense circuit OVS feed their outputs to a common fault trip circuit FT shown at the upper right-hand portion of FIG. 3a. Output terminals G2 and K2 of this fault trip circuit provide a gating signal for fault thyristor FSCR as shown in FIG. 1. The functions of these circuits will now be described in more detail.

Referring to over-current sense circuit OCS in FIG. 3a, input A thereof is connected to the anode of thyristor GTO as shown in FIG. 1. Whenever clamp thyristor GTO is turned on, the voltage at input A goes from high to low and when thyristor GTO is turned off, this voltage at input A goes from low to high as indicated graphically by the pulse adjacent thereto. This input voltage is reduced to a proper level compatible with the logic elements by voltage divider resistors R29 and R30 connected in series from the input to common and the resultant voltage is applied from the junction of these resistors through input resistor R31 to the inverting input of comparator CMP2 which may be of the LM311 type or the like.

A bias voltage is applied to the noninverting input of comparator CMP2 as follows. Normally, when thyristor GTO is off, the output of comparator CMP2 is low. The 5 volt output of precision reference device 50 in FIG. 3b is applied through voltage divider resistors R32 and R33 to common and the voltage from the junction of these resistors, which may be 2.5 volts or the like, is applied through the voltage divider including resistor R34, diode D4 and resistor R35, connected from the junction of resistors R32 and R33 to the output of the comparator, to apply a bias voltage lower than 2.5 volts on the noninverting input of the comparator. This output of comparator CMP2 is connected through resistor R36 to plus 12 volts. Under these conditions, timing capacitor C12 discharges through resistor R37 and diode D5. When thyristor GTO is turned on to dissipate the voltage spike, and the voltage at input A goes low, the output of comparator CMP2 goes high as indicated by the leading edge of the pulse adjacent thereto. This high blocks diode D4 to cause the bias voltage on the noninverting input to rise to 2.5 volts to reinforce high state turn-on of the comparator. This high is applied through an RC timing circuit including resistor R38 and capacitor C12 to provide an increasing pulse, as indicated graphically adjacent thereto, which is applied through input resistor R39 to the inverting input of comparator CMP3. The noninverting input of comparator CMP3 is biased to substantially 7.2 volts by a voltage divider including resistors R40 and R41 connected from plus 12 volts to common. Therefore, it will be seen that when the timed increasing voltage rises above the bias voltage at the end of 1.2 milliseconds, the output of comparator CMP3 switches from high to low. This allows current flow through diode D5 and resistor R42 to reduce the bias voltage and reinforce low state turn-on of comparator CMP3. The values in the RC timing circuit may be set so that it will take about 1.2 milliseconds after thyristor GTO is turned on for the output of comparator CMP3 to switch low. This provides a trip signal to fault trip circuit FT. The manner in which this fault trip circuit FT functions to provide a gating pulse will be described after first considering the operation of over-voltage sense circuit OVS.

At the upper left-hand portion of FIG. 3a, an operational amplifier AMP3 such as a 741 OP AMP is used to provide the desired bias voltage for comparator CMP4 of over-voltage sense circuit OVS. For this purpose, the same precise 5 volts that was applied to the over-current sense circuit is also applied through input resistor R43 to the noninverting input of amplifier AMP3. This causes the output of amplifier AMP3 to go to a positive voltage which is applied through voltage divider resistors R44 and R45 to common. The ratio of these voltage divider resistors is selected so that the voltage from the junction thereof that is applied to the inverting input of amplifier AMP3 is of such a value that the output of the amplifier will remain at 6.5 volts or the like. This will be the case if both inputs are very close to 5 volts. This output voltage of the amplifier is applied through resistor R46 to the noninverting input of comparator CMP4. It will be recalled from the early description, that the voltage at junction 48 at the upper left-hand portion of FIG. 3b was 1 volt for each 200 volts of compacitor voltage VC. This voltage at junction 48 is applied through resistor R47 to the inverting input of comparator CMP4 in overvoltage sense circuit OVS. Therefore, when the capacitor C voltage in FIG. 1 reaches 1300 volts or the like, the voltage at the inverting input of comparator CMP4 reaches the value of the bias voltage or 6.5 volts thereby causing the output of the comparator to switch from high-to-low. This high-to-low output voltage of over-voltage sense circuit OVS provides a trip signal to fault trip circuit FT. When the output of comparator CMP4 goes low, diode D6 allows current flow therethrough and through resistor R48 to reinforce low state turn-on of the comparator by reducing the bias voltage on the noninverting input of comparator CMP4 to a predetermined value. The outputs of comparators CMP3 and CMP4 are connected through resistor R48 to the plus 12 volt DC supply. It will, therefore, be seen that the high-to-low trip signal from the output of over-voltage sense circuit OVS is like the high-to-low trip signal from over-current sense circuit OCS, either one of which may be applied to operate fault trip circuit FT, the operation of which will now be described.

The high-to-low trip pulse from either of the aforementioned over-current or over-voltage sense circuits is first applied to differentiating circuit DF3 which includes a resistor R49 and a capacitor C13 connected in series from the plus 12 volt supply to the outputs of the two aforementioned circuits. The high-to-low transition of the trip pulse causes the differentiating circuit DF3 to provide a negative input pulse to the inverting input of comparator CMP5, this inverting input being also connected through diode D7 to the plus 12 volt supply to limit the maximum voltage thereat. A positive bias voltage to the noninverting input of comparator CMP5 is applied from the plus 12 volt supply through diode D8 and voltage divider resistors R50 and R51 to common and through voltage divider resistors R50 and R53 and diode D9 to low. As a result, the negative input pulse at the inverting input causes comparator CMP5 to issue a positive pulse at its output as indicated graphically by the pulse adjacent thereto, this output being connected through resistor R52 and diode D8 to the plus 12 volt supply. This positive pulse blocks diode D9 to cause a predetermined higher positive value of voltage to be applied to the noninverting input of comparator CMP5 to reinforce low state turn-off thereof at the end of the input pulse. The positive output pulse of comparator CMP5 is then applied through diode D10 to the gate of field effect transistor FET3 to turn this transistor on. As a result, current flows from the plus 12 volt source through diode D8, resistor R54, transistor FET3 and resistor R55 to common so that a gating pulse is applied from the upper end of resistor R55 and output terminal G2 to gate fault thyristor FSCR on in FIG. 1. The consequent current flow through this thyristor causes a fault trip signal to be induced in coil 34 and applied through terminals 36 to a control circuit or the like that will phase back power to shut down the system for protective purposes. Resistor R56 limits reverse gate current while diode D10 allows the output pulse of comparator CMP5 to be applied without limitation to the gate of the transistor. Capacitor C14 supplies turn-on current to the fault SCR in the event of power loss. Resistor R55 provides gate cathode impedance for the fault SCR. The output pulse of comparator CMP5 is of sufficient length such as, for example, 46 microseconds long, controlled by differentiating circuit DF3 to insure turn-on of fault thyristor FSCR when required.

To summarize, in the event there is a fault in the system to the effect that thyristor GTO of the clamp circuit remains on for an undue period of time such as longer than 1.2 milliseconds, a clamp Ra and fault trip action will take place. The resistor clamp Ra–b circuit is turned on for short periods of time to suppress spike voltages when required but is not allowed to remain on so long as to overload the clamp components or interfere with drive system operation. Also, if the capacitor C voltage should continue to rise indicating that the clamp circuit has failed to be turned on and should rise as high as 1300 volts which is indicative of an over-voltage condition, a clamp Ra and fault trip action will take place so as to protect the system.

While the apparatus hereinbefore described is effectively adapted to fulfill the object stated, it is to be understood that the invention is not intended to be confined to the particular preferred embodiment of current source inverter commutation-spike-voltage protection circuit including over-current and over-voltage protection disclosed, inasmuch as it is susceptible of various modifications without departing from the scope of the appended claims.

I claim:

1. In an adjustable frequency A.C. motor control system having a solid state inverter supplied by adjustable D.C. voltage for applying adjustable frequency current to the A.C. motor input terminals and said inverter having low voltage power devices for switching the current into the motor phases and means for commutating the power devices in the proper order, and said switching causing large voltage transients or voltage spikes to be produced which would be impressed on the motor and which might damage the inverter power devices, the improvement comprising:

means for dissipating excess commutation energy so as to keep the voltage spikes at a controlled level comprising:

a spike voltage clamp circuit connected to said input terminals of the motor comprising:

resistor means for dissipating the commutation energy;

a turn-on turn-off switching device for connecting said resistor means in circuit so as to perform its energy dissipating function each time it is needed and for disconnecting said resistor means therefrom when it has performed its function;

voltage storage means for storing the voltage appearing at said input terminals;

decoupling means between said input terminals and said voltage storage means for decoupling said resistor means from said input terminals whenever the voltage on said input terminals falls below the voltage on said storage means;

and clamp control means for sensing the voltage on said storage means and being responsive to a predetermined magnitude of voltage thereon for turning on said switching device to connect said resistor means in said circuit to limit said voltage and for turning off said switching device when said voltage has decreased to another predetermined value thereby to control said voltage spikes to a safe level.

2. The improvement claimed in claim 1, wherein:

said decoupling means comprises a full-wave rectifier bridge for rectifying the current and voltage received from said terminals to apply direct current and voltage to said voltage storage means.

3. The improvement claimed in claim 2, wherein:

said voltage storage means comprises a capacitor connected to the output terminals of said full-wave rectifier bridge;

and said clamp control means comprises power supply means for precharging said capacitor to a predetermined voltage.

4. The improvement claimed in claim 1 or 3, wherein:

said turn-on turn-off switching device comprises a gate turn-off thyristor.

5. The improvement claimed in claim 1, wherein:

said clamp control means comprises failure protection means for providing a fault trip signal in the event said switching device fails to turn off after a predetermined time interval after turn-on thereof which would be indicative of a fault in the system comprising:

over-current sense means for sensing the on-state of said switching device;

timing means responsive to said over-current sense means at the start of said on-state for timing a predetermined time interval;

reset means operative if said switching device is turned off before the end of said time interval for resetting said timing means;

and fault trip means responsive to said timing means timing out if said switching means is not turned off before the end of said time interval for providing a fault trip control signal.

6. The improvement claimed in claim 1, wherein:

said clamp control means comprises failure protection means for providing a fault trip signal in the event said voltage on said voltage storage means continues to rise above said predetermined magnitude and reaches a higher predetermined value thereabove which would be indicative of failure of said switching means to turn on comprising:

over-voltage sense means for sensing the voltage on said storage means and being responsive to said storage voltage reaching said higher predetermined value for providing a fault trip control signal.

7. The improvement claimed in claim 5 or 6, wherein:

said clamp control means also comprises means responsive to said fault trip control signal for providing a gating signal of predetermined length;

and said spike voltage clamp circuit comprises:

a thyristor connected to said resistor means and responsive to said gating signal for connecting at least a portion of said resistor means in said circuit to perform its energy dissipating function;

and means responsive to said gated thyristor for providing a trip signal for performing a protective function in the drive system.

* * * * *